United States Patent
Aldana et al.

(10) Patent No.: US 8,392,785 B2
(45) Date of Patent: *Mar. 5, 2013

(54) METHOD AND SYSTEM FOR A TRANSMITTING ANTENNA SELECTION FAILURE RECOVERY MODE

(75) Inventors: Carlos Aldana, Sunnyvale, CA (US); Vinko Erceg, Cardiff by the Sea, CA (US); Matthew J. Fischer, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/460,628

(22) Filed: Apr. 30, 2012

(65) Prior Publication Data
US 2012/0213056 A1 Aug. 23, 2012

Related U.S. Application Data

(63) Continuation of application No. 12/201,737, filed on Aug. 29, 2008, now Pat. No. 8,176,378.

(60) Provisional application No. 60/970,706, filed on Sep. 7, 2007.

(51) Int. Cl.
*H04L 1/14* (2006.01)
(52) U.S. Cl. ........................................ 714/750; 714/748
(58) Field of Classification Search .................. 714/748, 714/750
See application file for complete search history.

(56) References Cited

U.S. PATENT DOCUMENTS

| | | | | |
|---|---|---|---|---|
| 7,631,240 B2 * | 12/2009 | Frederiks et al. | ............. | 714/748 |
| 8,176,378 B2 * | 5/2012 | Aldana et al. | ................. | 714/750 |
| 2003/0012318 A1 * | 1/2003 | Piirainen | ........................ | 375/358 |
| 2007/0207730 A1 * | 9/2007 | Nguyen et al. | .................. | 455/39 |
| 2008/0247370 A1 * | 10/2008 | Gu et al. | ........................ | 370/338 |
| 2010/0061475 A1 * | 3/2010 | Mo et al. | ........................ | 375/261 |

OTHER PUBLICATIONS

Tomoaki Kumagai, Masato Mizoguchi, Takeshi Onizawa, Hitoshi Takanashi, Masahiro Morikura; "A Maximal Ratio Combining Frequency Diversity ARQ Scheme for OFDM Signals"; IEEE; Sep. 1998; 0-7803-4872; pp. 528-532.

* cited by examiner

*Primary Examiner* — Joshua Lohn
(74) *Attorney, Agent, or Firm* — Garlick & Markison

(57) ABSTRACT

Aspects of a method and system for a transmitting antenna selection failure recover mode are presented. Aspects of the system may include a transmitting mobile terminal that enables selection of a sequence of protocol data units (PDU), for example a sequence of sounding frames, which may be transmitted during an antenna selection procedure. During transmission of the selected PDU sequence, the transmitting mobile terminal may receive an antenna selection failure indication frame. The transmitting mobile terminal may enable retransmission of at least one previously transmitted PDU in the PDU sequence based on the failure indication. Transmission of subsequent PDUs in the PDU sequence may resume after the retransmission. Alternatively, upon receipt of the failure indication frame the transmitting mobile terminal may restart the selected frame sequence from the beginning, or may select a subsequent PDU frame sequence.

20 Claims, 6 Drawing Sheets

METHOD AND SYSTEM FOR A TRANSMITTING ANTENNA SELECTION FAILURE RECOVERY MODE

CROSS-REFERENCE TO RELATED APPLICATIONS

The present U.S. Utility Patent Application claims priority under 35 U.S.C. §120, as a continuation of U.S. Utility patent application Ser. No. 12/201,737, filed Aug. 29, 2008, which is incorporated herein by reference in its entirety for all purposes. The Ser. No. 12/201,737 application claims priority under 35 U.S.C. §119(e) to U.S. Provisional Application No. 60/970,706, filed Sep. 7, 2007, which is also incorporated herein by reference in its entirety for all purposes.

FIELD OF THE INVENTION

Certain embodiments of the invention relate to wireless communication. More specifically, certain embodiments of the invention relate to a method and system for a transmitting antenna selection failure recovery mode.

BACKGROUND OF THE INVENTION

Multiple input multiple output (MIMO) systems are wireless communications systems that may transmit signals utilizing a plurality of transmitting antennas, and/or receive signals utilizing a plurality of receiving antennas. Communications between MIMO systems may be based on specifications from the Institute of Electrical and Electronics Engineers (IEEE). A MIMO system that receives a signal Y may compute a channel estimate matrix, H, based on the received signal. The signal may comprise information generated from a plurality of information sources. Each such information source may be referred to as a spatial stream.

An exemplary wireless communication system is a wireless local area network (WLAN) system, such as is defined by IEEE 802.11 specifications. In a WLAN a physical layer protocol data unit (PPDU) represents the basic data unit transmitted and/or received in a WLAN system. The PPDU may, in turn, comprise a series of fields, such as a data field. The data field within a PPDU may also be referred to as a physical layer service data unit (PSDU), or payload. An exemplary PPDU definition may be found in an applicable standards document, such as IEEE 802.11.

A MIMO transmitter may combine spatial streams to generate one or more to-be-transmitted RF chains. A group of to-be-transmitted RF chains may be simultaneously transmitted as a signal vector X. A transmitting MIMO system may utilize a plurality of transmitting antennas when transmitting the signal vector X. A receiving MIMO system may utilize a plurality of receiving antennas when receiving a corresponding signal vector Y.

When the number of to-be-transmitted RF chains is less than the number of transmitting antennas at the MIMO transmitter, an RF chain may be transmitted simultaneously via a plurality of transmitter antennas. This technique may be referred to as transmitter diversity. When utilizing transmitter diversity, the MIMO transmitter may assign, or map, individual to-be-transmitted RF chains for transmission via individual transmitting antennas. Similarly, a MIMO receiver may utilize receiver diversity when the number of received RF chains is less than the number of receiving antennas. When utilizing receiver diversity, the MIMO receiver may assign, or map, individual received RF chains to individual receiving antennas.

Antenna selection is a procedure which may enable a MIMO transmitter to map individual RF chains to individual transmitting antennas, and/or enable a MIMO receiver to map individual RF chains to individual receiving antennas. In conventional MIMO systems, antenna selection procedures at the MIMO transmitter may enable a transmitting antenna to transmit a sequence of sounding frames that enable a MIMO receiver to communicate antenna selection feedback information. Based on the antenna selection feedback information, the MIMO transmitter may enable mapping of individual to-be-transmitted RF chains to individual transmitting antennas at the MIMO transmitter.

Under some circumstances, the antenna selection procedure may end before completion. For example, the MIMO receiver may detect a missing sounding frame in the sequence of sounding frames transmitted by the MIMO transmitter, or the MIMO transmitter may receive old, or "stale", feedback information from the MIMO receiver. In instances when the antenna selection procedure ends before completion, the MIMO transmitter and MIMO receiver may need to restart the antenna selection procedure from the beginning. In such case, the MIMO transmitter may restart the antenna selection procedure by retransmitting at least the first sounding frame in the sounding frame sequence.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and system for a transmitting antenna selection failure recovery mode, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention relate to a method and system for a transmitting antenna selection failure recovery mode. In one aspect of the invention, a MIMO transmitter may initiate an antenna selection procedure by transmitting a sequence of antenna selection frames (for example, sounding frames) to a MIMO receiver. In the event that the antenna selection procedure is prematurely terminated, the MIMO receiver may determine the condition which caused the premature termination of the antenna selection procedure. The MIMO receiver may also determine the first antenna selection frame in the antenna selection frame sequence, which was detected as being improperly received. Based on the determined cause for the premature termination, the MIMO receiver may send an antenna selection failure indication frame to the MIMO transmitter. The antenna selection failure indication frame may indicate that a failure was detected at the MIMO receiver during the current antenna selection procedure. The antenna selection failure indication frame may also indicate whether the antenna selection procedure should restart from the beginning, or whether the antenna selection procedure should resume from the point of failure detection. The antenna selection procedure may resume by retransmitting the first antenna selection frame in the antenna selection frame sequence, which was detected as being improperly received at the MIMO receiver. Upon receipt of the antenna selection failure indication frame, the MIMO transmitter may either continue the current antenna selection procedure (i.e., by continuing to transmit antenna selection frames in the antenna selection frame sequence) without interruption, resume the antenna selection procedure by transmitting the first improperly received antenna selection frame as indicated in the antenna selection failure indication frame or restart the antenna selection procedure from the beginning (i.e., by retransmitting the first antenna selection frame in the antenna selection frame sequence).

Figure 1:
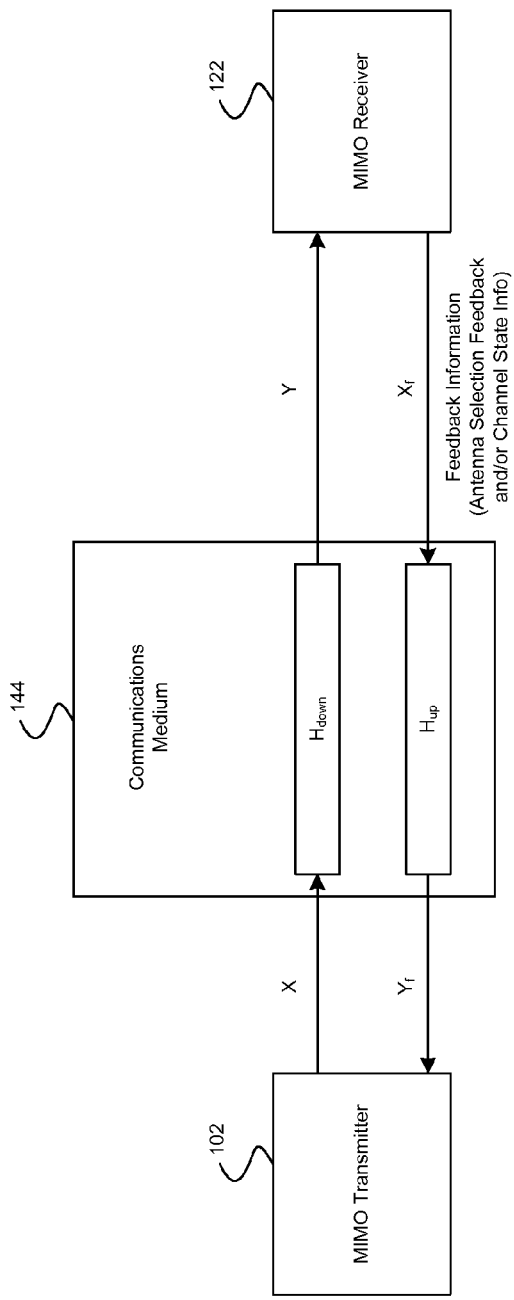
FIG. 1 is an exemplary diagram illustrating antenna selection feedback, which may be utilized in connection with an embodiment of the invention.

FIG. 1 is an exemplary diagram illustrating antenna selection feedback, which may be utilized in connection with an embodiment of the invention. Referring to FIG. 1, there is shown a transmitting mobile terminal 102, a receiving mobile terminal 122, and a communications medium 144. The communications medium 144 may represent a wireless communications medium, for example. The transmitting mobile terminal 102 may transmit a signal vector X to the receiving mobile terminal 122 via the communications medium 144. The communications direction from the transmitting mobile terminal 102 to the receiving mobile terminal 122 may be referred to as a downlink direction. The signal vector X may comprise signals from one or more RF chains, which are transmitted via one or more transmitting antennas. Each of the one or more RF chains may comprise signals, each of which may comprise at least a portion of one or more antenna selection frames. The signal vector X may travel through the communications medium 144 and may be altered during such travel. The transmission characteristics associated with the communications medium 144 may be characterized by a transfer function H. The signal vector X may be altered based on the transfer function H. In the downlink direction, the transfer function H may be referred to as $H_{down}$. The altered signal vector X may be represented as the signal Y. The receiving mobile terminal 122 may receive the signal Y.

The receiving mobile terminal 122 may determine one or more values associated with the transfer function $H_{down}$ based on for example, preamble information contained within the signal Y received via the communications medium 144. Based on the sequence of received signals Y, and the computed transfer function, $\hat{H}_{down}$, the receiving mobile terminal 122 may compute one antenna selection feedback vector. The antenna selection feedback vector may be computed upon successful reception of an antenna selection frame sequence.

Each antenna selection feedback vector may comprise a plurality of bits, which may enable the transmitting mobile terminal 102 to assign specific RF chains to specific transmitting antennas. The antenna selection feedback vector may also comprise channel state information (CSI), which enables the transmitting mobile terminal 102 to assign RF chains to specific transmitting antennas.

The receiving mobile terminal 122 may communicate the antenna selection feedback vectors via a transmitted signal vector $X_f$. The transmitted signal vector $X_f$ may be transmitted to the transmitting mobile terminal 102 via the communications medium 144. The signal vector $X_f$ may be altered while traveling through the communications medium 144. The communications direction from the receiving mobile terminal 122 to the transmitting mobile terminal 102 may be referred to as an uplink direction. The signal vector $X_f$ may be altered based on the transfer function H. In the uplink direction, the transfer function H may be referred to as $H_{up}$. The altered signal vector $X_f$ may be represented as the signal $Y_f$. The transmitting mobile terminal 102 may receive the signal $Y_f$.

The transmitting mobile terminal 102 may assign individual transmitting antennas to individual to-be-transmitted RF chains based on one or more received signals $Y_f$. Subsequent data from a to-be-transmitted RF chain may be transmitted via one or more transmitting antennas that were assigned according to the previously received antenna selection feedback vectors.

Figure 2:
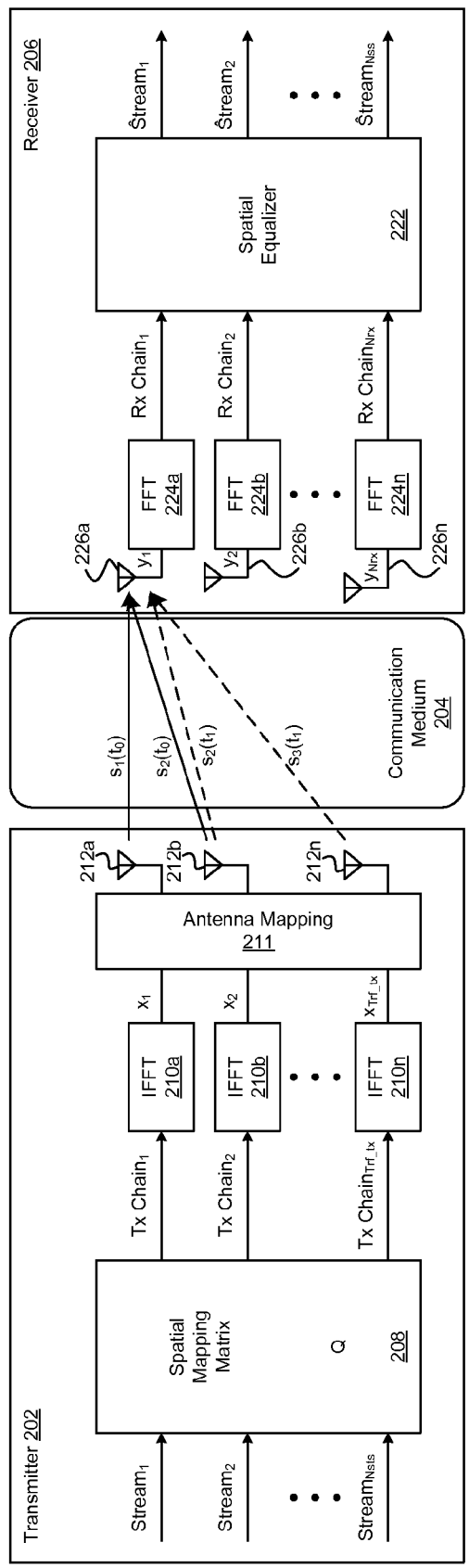
FIG. 2 is an exemplary MIMO system, which may be utilized in connection with an embodiment of the invention.

FIG. 2 is an exemplary MIMO system, which may be utilized in connection with an embodiment of the invention. Referring to FIG. 2, there is shown a transmitting mobile terminal 202, a receiving mobile terminal 206, and a wireless communication medium 204. An exemplary transmitting mobile terminal 202 may be an IEEE 802.11 WLAN access point (AP). An exemplary receiving mobile terminal 206 may be an IEEE 802.11 WLAN station (STA). The transmitting mobile terminal 202 may be a MIMO system. The receiving mobile terminal 206 may be a MIMO system. The transmitting mobile terminal 202 may comprise a transmit spatial mapping matrix 208, a plurality of inverse fast Fourier transform (IFFT) blocks 210a, 210b, . . . , and 210n, an antenna mapping block 211 and a plurality of transmitting antennas 212a, 212b, . . . , and 212n. The receiving mobile terminal 206 may comprise a spatial equalizer 222, a plurality of fast Fourier transform (FFT) blocks 222a, 222b, . . . , and 222n, and a plurality of receiving antennas 226a, 226b, . . . , and 226n.

The spatial mapping matrix 208 may comprise a steering matrix Q that may be used to perform computations on a plurality of space-time streams, or spatial streams (where Nsts is a variable representing the number of space-time/spatial streams), and generates a plurality of to-be-transmitted RF chains, Trf_tx, wherein Trf_tx≧Nsts is a variable representing the number of to-be-transmitted RF chains. The plurality of space-time streams may comprise a first space-time stream, $Stream_1$, a second space-time stream, $Stream_2$, . . . and an $Nsts^{th}$ space-time stream, $Stream_{Nsts}$. The plurality of to-be-transmitted RF chains may comprise a first transmitted RF chain, $Tx\ Chain_1$, a second transmitted RF chain, $Tx\ Chain_2$ 308, a $Trf\_tx^{th}$ transmitted RF chain, $Tx\ Chain_{Trf\_tx}$. Each of the to-be-transmitted RF chains $Tx\ Chain_1$, $Tx\ Chain_2$, . . . , and $Tx\ Chain_{Trf\_tx}$ may comprise a corresponding weighted sum computed from the plurality of space-time streams $Stream_1$, $Stream_2$, . . . , and $Stream_{Nsts}$, based on coefficients in the steering matrix Q.

The IFFT block 210a may perform IFFT calculations to transform a frequency-domain representation of the to-be-transmitted RF chain, $Tx\ Chain_1$, to a time-domain representation. The IFFT block 210b may perform IFFT calculations to transform a frequency-domain representation of the to-be-transmitted RF chain, Tx Chain$_2$, to a time-domain representation. The IFFT block 210n may perform IFFT calculations to transform a frequency-domain representation of the to-be-transmitted RF chain, Tx Chain$_{Trf\_tx}$, to a time-domain representation.

The antenna mapping block 211 may comprise suitable logic, circuitry and/or code to enable transmission of one or more of the plurality of Trf_tx time domain signals. The antenna mapping block 211 may enable selected time domain signals to be transmitted via selected antennas from a plurality of Ntx transmitting antennas 212a, 212b, . . . and 212n (where Ntx represents a number of transmitting antennas). For example, the antenna block 211 may enable the time-domain representation of the to-be-transmitted RF chain, x$_1$, to be transmitted via the transmitting antenna 212a to the wireless communications medium 204. The time-domain representation of the to-be-transmitted RF chain, x$_2$, may be transmitted via the transmitting antenna 212b to the wireless communications medium 204. The time-domain representation of the to-be-transmitted RF chain, X$_{Trf\_tx}$, may be transmitted via the transmitting antenna 212n to the wireless communications medium 204. The one or more RF chain signals, which may be transmitted at a given time instant may be represented by a transmitted signal vector, X.

The receiving antenna 226a may receive a signal y$_1$ via the wireless communications medium 204. The FFT block 224a may perform FFT calculations to transform a time-domain of the received signal, y$_1$, to a frequency-domain representation of a received RF chain, Rx Chain$_1$. The receiving antenna 226b may receive a signal y$_2$ via the wireless communications medium 204. The FFT block 224b may perform FFT calculations to transform a time-domain of the received signal, y$_2$, to a frequency-domain representation of a received RF chain, Rx Chain$_2$. The receiving antenna 226n may receive a signal y$_{Nrx}$ via the wireless communications medium 204. Nrx may be a variable representing the number of receiving antennas at the receiving mobile terminal 206. The FFT block 224n may perform FFT calculations to transform a time-domain of the received signal, y$_{Nrx}$, to a frequency-domain representation of a received RF chain, Rx Chain$_{Nrx}$. The plurality of received RF chains may be represented by a received signal vector Y.

The spatial equalizer 222 may perform computations on a received plurality of Nrx RF chains, and generate a plurality of Nsts estimated space-time streams. The plurality of received RF chains may comprise a first received RF chain, Rx Chain$_1$, a second received RF chain, Rx Chain$_2$ 308, an Nrx$^{th}$ received RF chain, Rx Chain$_{Nrx}$. The plurality of estimated space-time streams may comprise a first estimated space-time stream, $\hat{S}$tream$_1$, a second estimated space-time stream, $\hat{S}$tream$_2$, and an Nsts$^{th}$ estimated space-time stream, $\hat{S}$tream$_{Nss}$. Each of the plurality of estimated space-time streams at the receiving mobile terminal 206 may comprise an estimated value for a corresponding space-time stream, $\hat{S}$tream$_1$, $\hat{S}$tream$_2$, . . . , $\hat{S}$treamNss, at the transmitting mobile terminal 202.

Antenna selection enables each individual RF chain in the plurality of RF chains, Tx Chain$_1$, Tx Chain$_2$, . . . , Tx Chain$_{Trf\_x}$, to be assigned for transmission by one or more of the transmitting antennas 212a, 212b, . . . , and 212n when the number of RF chains selected for transmission is less than the number of transmitting antennas. In this regard, the number of transmitted RF chains, Trf_tx, is less than the number of transmitting antennas, Ntx, i.e. Trf_tx<Ntx. The antenna selection procedure may enable specification of a correspondence between individual RF chains and transmitting antennas, which are utilized for transmitting signals associated with the individual RF chains. For example, when Trf_tx=2, and Ntx=3, a first transmitting antenna may transmit a first RF chain, Tx Chain$_1$ while a second transmitting antenna may concurrently transmit a second RF chain, Tx Chain$_2$. In this instance, the third transmit antenna may not transmit a signal, i.e. will be silent.

During the antenna selection procedure, the transmitting mobile terminal 202 may transmit a sequence of sounding frames via one or more transmitting antennas. The number of sounding frames transmitted during the sequence, N$_{seq}$, may be equal to an integer whose value is greater than or equal to $$\frac{Ntx}{Trf\_tx}.$$

In an exemplary embodiment of the invention for which Trf_tx=2, and Ntx=3, the antenna selection procedure may transmit a sequence of 2 sounding frames (where $$2 \geq \frac{3}{2}\bigg).$$

For example, at a time instant t$_0$, a sounding frame may be transmitted from TX Chain$_1$ via the transmitting antennas 212a and 212b in signals labeled s$_1$(t$_0$) and s$_2$(t$_0$) in FIG. 2. The signals may travel through the communication medium 204 and be received at the receiving antenna 226a, for example. At a time instant t$_0$, a sounding frame may be transmitted from the TX Chain$_1$, via the transmitting antennas 212a and 212b, in signals labeled s$_1$(t$_0$) and s$_2$(t$_0$) in FIG. 2. The signals may travel through the communication medium 204 and be received at the receiving antenna 226a, for example. At a time t$_1$, a second sounding frame may be transmitted from the TX Chain$_2$, via the transmitting antennas 212b and 212n, in signals labeled s$_2$(t$_1$) and s$_3$(t$_1$) in FIG. 2. The signals may travel through the communication medium 204 and be received at the receiving antenna 226a, for example.

In various embodiments of the invention, the receiving mobile terminal 206 may detect a failure to receive for example, the second sounding frame. In response, the receiving mobile terminal 206 may send a protocol data unit (PDU), for example a PLCP data unit, to the transmitting mobile terminal 202. An exemplary PDU may comprise a frame. An exemplary PDU may comprise an MAI (modulation coding scheme or antenna selection indication) field, which comprises a value that indicates to the transmitting mobile terminal 202 that the PDU comprises an antenna selection failure indication frame (for example, MAI=14). The exemplary antenna selection failure indication frame may comprise an antenna selection (ASEL) Command field, which comprises a value that indicates that a failure was detected at the receiving mobile terminal 206 during the antenna selection procedure (for example, ASEL Command=5). The exemplary antenna selection failure indication frame may also comprise an ASEL Data field, which comprises a value that indicates the first frame in the antenna selection frame sequence which was not successfully received at the receiving mobile terminal 206. For example, assuming that numbering of sounding frames begins with value of 0, the receiving mobile terminal 206 may send an antenna selection failure indication frame comprising a value ASEL Data=1 to indicate that the receiving mobile terminal 206 detected a failure to receive the second sounding frame in the sounding frame sequence depicted in FIG. 3. Alternatively, the receiving mobile terminal 206 may receive the second sounding frame but determine that the information contained in the previously transmitted first sounding frame is stale. This may occur based on an evaluation of the contents of the received sounding frame and/or in instances when there is an excessive time delay between receipt of the first sounding frame and receipt of the second sounding frame, for example. In such case, the receiving mobile terminal 206 may send an antenna selection failure indication frame comprising a value ASEL Data=0.

In an exemplary embodiment of the invention, upon receipt of the antenna selection failure indication frame, the transmitting mobile terminal 202 may inspect the ASEL Data field. In instances when the value ASEL Data=k, where k>0, the transmitting mobile terminal 202 may resume the antenna selection procedure by retransmitting the antenna selection frame sequence beginning with the $(k+1)^{th}$ sounding frame in the sequence. For example, when ASEL Data=1, the transmitting mobile terminal 202 may resume the antenna selection procedure by retransmitting the second sounding frame in the antenna selection frame sequence. The first retransmitted sounding frame may comprise an ASEL Command field, which comprises a value that indicates that the retransmitted sounding frame is being sent in connection with a resumption of the antenna selection procedure (TXASSSR, indicated by for example, ASEL Command=1). The retransmitted sounding frame may also comprise an ASEL Data field, which comprises a value that indicates to the receiving mobile terminal 206 that the retransmitted frame is the $(k+1)^{th}$ sounding frame in the antenna selection frame sequence (for example, ASEL Data=k). The transmitting mobile terminal 202 may continue the resumed antenna selection procedure by transmitting sounding frames $(k+1)$–$N_{seq}$ in the antenna selection frame sequence. In this aspect of the invention, the antenna selection procedure may resume by repeating only a portion of the sounding frames from the full antenna selection frame sequence by skipping retransmission of sounding frames 0 through $(k-1)$ in the sounding frame sequence.

In instances when the value ASEL Data=0, the transmitting mobile terminal 202 may resume the antenna selection procedure by retransmitting the antenna selection frame sequence from the beginning. For example, when ASEL Data=0, the transmitting mobile terminal may resume the antenna selection procedure by retransmitting the first sounding frame and subsequently retransmitting the second sounding frame, and/or any subsequent frames that are awaiting transmission. In this aspect of the invention, the antenna selection procedure may be resumed by repeating the full antenna selection frame sequence. The first sounding frame in the retransmitted antenna selection frame sequence may comprise an ASEL Command field, which comprises a value that indicates to the receiving mobile terminal 206 that the transmitting mobile terminal 202 is beginning to transmit an antenna selection frame sequence (TXASSI, indicated by for example ASEL Command=0, or TXASSI with channel state information feedback from the receiver, TXASSI-CSI, indicated by for example, ASEL Command=6). The first sounding frame may also comprise an ASEL Data field, which comprises a value, $N_{seq}$, which indicates the number of sounding frames in the antenna selection frame sequence, for example, ASEL Data=2 when $N_{seq}=2$.

Figure 3:
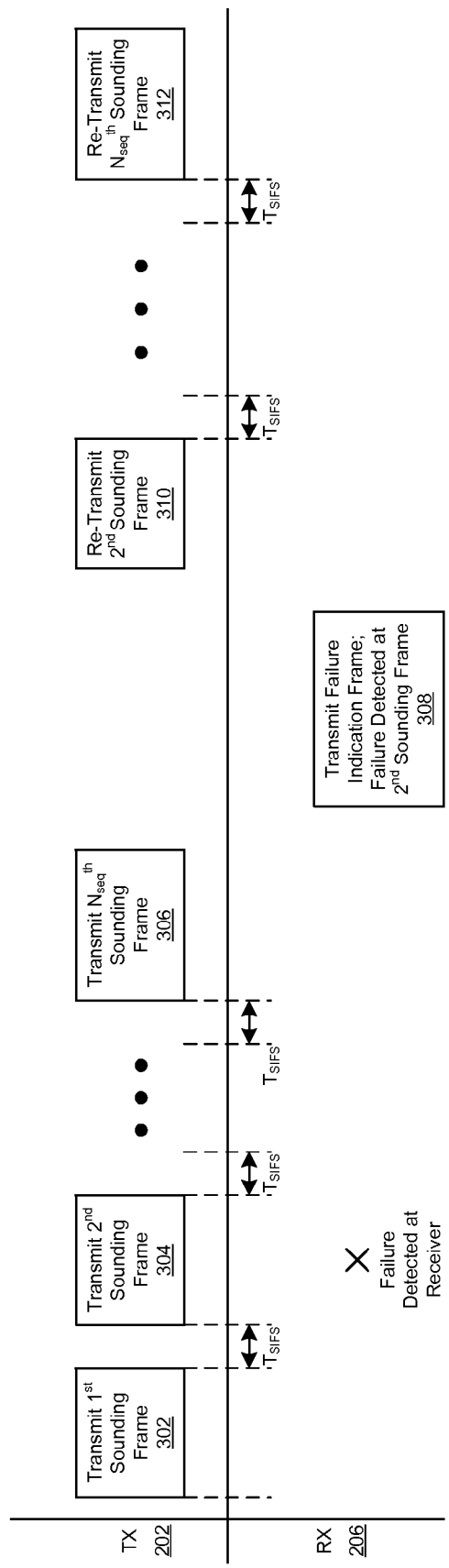
FIG. 3 is a diagram that illustrates an exemplary antenna selection frame sequence with resumption following antenna selection failure, in accordance with an embodiment of the invention.

FIG. 3 is a diagram that illustrates an exemplary antenna selection frame sequence with resumption following antenna selection failure, in accordance with an embodiment of the invention. Referring to FIG. 3, there is shown a plurality of frames sent by a transmitting mobile station (TX) 202. The TX 202 may transmit a sequence of antenna selection frames beginning with the first sounding frame 302. The first sounding frame 302 may comprise a TXASSI or TXASSI-CSI to indicate that the sounding frame 302 is the first sounding frame in a sounding frame sequence. The first sounding frame 302 may also comprise a value ASEL Data=$N_{seq}$ to indicate the number of sounding frames, which may be transmitted by TX 202 in the antenna selection frame sequence. The receiving mobile station (RX) 206 may receive the transmitted sounding frames.

At the end of transmission of the first sounding frame 302, an interframe spacing (IFS) time interval, for example a short interframe spacing (SIFS) time interval, may begin. While FIG. 3 presents an SIFS as an exemplary IFS time interval, various embodiments of the invention are not so limited. For example, an exemplary IFS time interval may also be represented by a point coordination function interframe spacing (PIFS) time interval. The duration of an exemplary SIFS is indicated as $T_{SIFS}$ in FIG. 3. The SIFS time interval may specify a time duration that may elapse before the TX 202 may transmit a second sounding frame 304 in the antenna selection frame sequence. At some time instant following the end of the SIFS, the TX 202 transmits a second sounding frame 304. The TX 202 may continue to transmit subsequent sounding frames, each separated in time by an SIFS, until the TX 202 transmits the final, or $N_{seq}^{th}$ sounding frame 306, in the sounding frame sequence.

The RX 206 may detect a failure during reception of the second sounding frame 304. In response to the detected failure, RX 206 transmits a failure indication frame 308 to TX 202. The failure indication frame 308 may be transmitted by RX 206 after TX 202 has transmitted sounding frame 306. The failure indication frame 308 may comprise a value ASEL Command=5 to indicate that a failure was detected during reception of the antenna selection frame sequence. The failure indication frame 308 may also comprise a value ASEL Data=2 to indicate that the failure was detected during reception of the $2^{nd}$ sounding frame in the antenna selection frame sequence. In general, the RX 206 may transmit the failure indication frame 308 to the TX 202 at the first transmit opportunity for RX 206.

Upon receipt of the antenna selection frame 308, the TX 202 may retransmit the second sounding frame 310. The retransmitted second sounding frame 310 may comprise a TXASSR to indicate that the retransmitted third sounding frame 310 is being retransmitted in connection with a resumption of the antenna selection frame sequence that was begun with the transmission of sounding frame 302. The TX 202 subsequently retransmits subsequent sounding frames in the sounding frame sequence through to the $N_{seq}^{th}$ sounding frame 312. In general, the TX 202 may retransmit frames in the sounding frame sequence beginning with the sounding frame indicated in the received failure indication frame 308 through to the last frame transmitted prior to receipt of the failure indication frame 308. The TX 202 may then continue with transmission of any remaining frames in the sounding frame sequence. Upon receipt of sounding frame 312 the RX 206 may transmit antenna selection feedback information frame to the TX 202.

Figure 4:
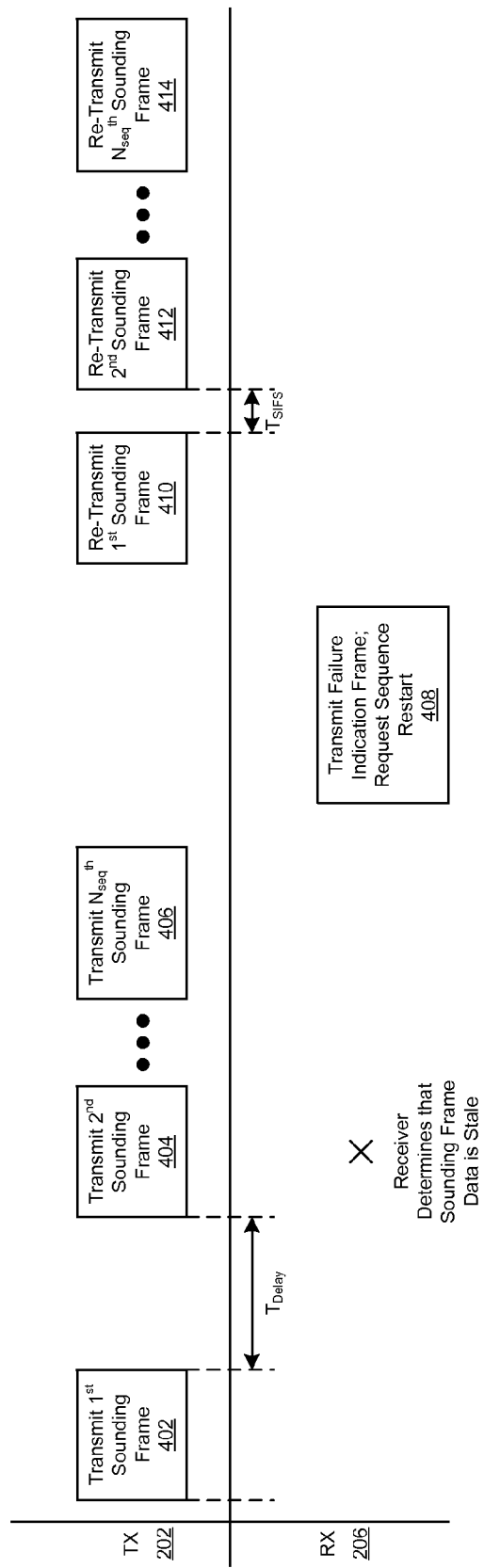
FIG. 4 is a diagram that illustrates an exemplary antenna selection frame sequence with restart following antenna selection failure, in accordance with an embodiment of the invention.

FIG. 4 is a diagram that illustrates an exemplary antenna selection frame sequence with restart following antenna selection failure, in accordance with an embodiment of the invention. Referring to FIG. 4, there is shown a plurality of frames sent by a transmitting mobile station (TX) 202. The TX 202 may transmit a sequence of antenna selection frames beginning with the first sounding frame 402. The first sounding frame 402 may comprise a TXASSI or TXASSI-CSI to indicate that the sounding frame 402 is the first sounding frame in a sounding frame sequence. The first sounding frame 402 may also comprise a value ASEL Data=$N_{seq}$ to indicate the number of sounding frames, which may be transmitted by TX 202 in the antenna selection frame sequence. The receiving mobile station (RX) 206 may receive the transmitted sounding frames.

After some time period of delay, the duration of which is indicated as $T_{Delay}$ in FIG. 4, the TX 202 transmits a second sounding frame 404. The TX 202 may continue transmitting sounding frames in sounding frame sequence through to the final, or $N_{seq}^{th}$ sounding frame 406, in the sounding frame sequence. During transmission of the sounding frame sequence, the RX 206 may determine that the data contained in the first sounding frame 402 is stale due to the length of the delay time period, $T_{Delay}$, between transmission of sounding frame 402 and sounding frame 404. As result, the RX 206 may detect a failure during the antenna selection frame sequence. In response to the detected failure, RX 206 may transmit a failure indication frame 408 to TX 202 after the TX 202 has transmitted sounding frame 406. As stated above, in general, the RX 206 may transmit the failure indication frame 408 at the earliest transmission opportunity. The failure indication frame 408 may comprise a value ASEL Command=5 to indicate that a failure was detected during reception of the antenna selection frame sequence. The failure indication frame 408 may also comprise a value ASEL Data=0 to indicate that the RX 206 requests that the TX 202 restart the antenna selection frame sequence from the beginning.

Upon receipt of the failure indication frame 408, the TX 202 may retransmit the first sounding frame 410. The retransmitted first sounding frame 410 may comprise a TXASSI or TXASSI-CSI to indicate that the retransmitted first sounding frame 410 is being retransmitted in connection with a restart of the antenna selection frame sequence from the beginning. The TX 202 may also retransmit the second sounding frame 412. The TX 202 may retransmit subsequent sounding frames through the $N_{seq}^{th}$ sounding frame 414. Upon receipt of sounding frame 414 the RX 206 may transmit antenna selection feedback information frame to the TX 202.

In various embodiments of the invention, upon receiving a request to restart an antenna selection frame sequence the transmitting mobile station 202 is not restricted to retransmitting the same antenna selection frame sequence that was begun prior to receiving the antenna selection failure indication frame. The transmitting mobile station 202 may retransmit the same antenna selection frame sequence, or may restart the antenna selection frame sequence by transmitting a different antenna selection frame sequence. For example, in instances when the transmitting mobile station 202 may select from a plurality of candidate antenna selection frame sequences, the transmitting mobile station 202 may utilize various methods for choosing an antenna selection frame sequence. For example, the transmitting mobile station 202 may utilize random selection, the transmitting mobile station 202 may select antenna selection frame sequences in a sequential order, or the transmitting mobile station 202 may select the same antenna selection frame sequence each time.

With reference to FIG. 3, the receiving mobile terminal 206 may transmit a request to restart an antenna selection frame sequence upon receipt of any retransmitted frame 310, . . . , and/or 312. For example, the receiving mobile terminal 206 may determine that the time delay between receipt of the first frame 302 in the antenna selection frame sequence and receipt of the retransmitted second frame 310 is sufficiently great that the contents of the first frame 302 are determined to be stale. In such case, the receiving mobile terminal 206 may transmit a failure indication frame, which requests restart of the antenna selection frame sequence, to the transmitting mobile terminal 202 after the receiving mobile terminal 206 receives retransmitted frame 312.

Also with reference to FIG. 3, the transmitting mobile terminal 202 may restart the antenna frame selection sequence in response to receiving failure indication frame 308 in instances when the transmitting mobile terminal 202 determines that the time delay between the transmission of the first transmitted frame 302 and the retransmission of the second frame 310 is sufficiently long that the transmitting mobile terminal 202 determines that the data contents of the transmitted first frame 302 will become stale. In such case, the transmitting mobile terminal 202 may retransmit the first frame in the antenna selection frame sequence in response to the failure indication frame 308.

Figure 5:
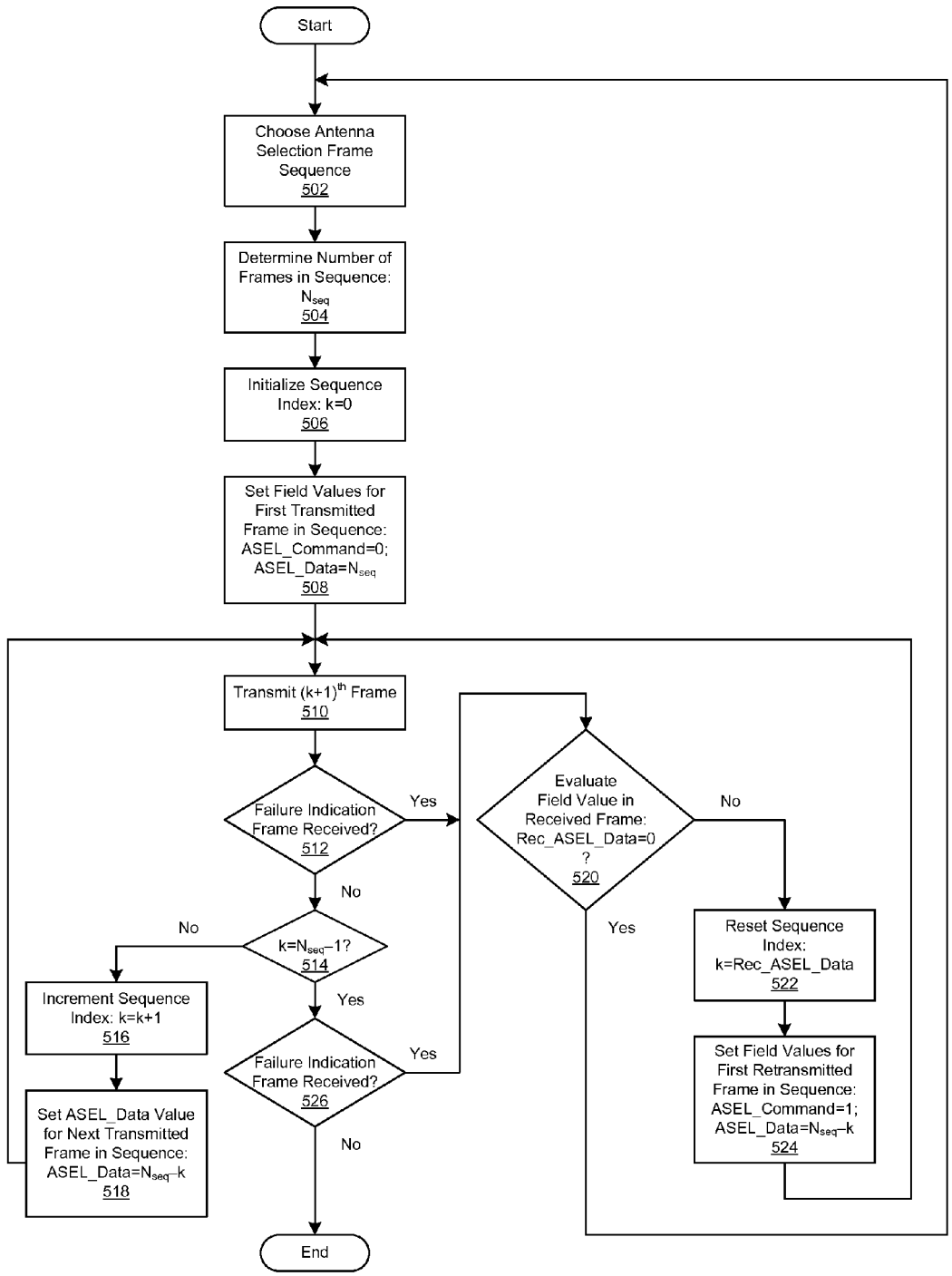
FIG. 5 is a flowchart illustrating exemplary steps for a transmitting antenna selection failure recovery mode at a transmitting mobile terminal, in accordance with an embodiment of the invention.

FIG. 5 is a flowchart illustrating exemplary steps for a transmitting antenna selection failure recovery mode at a transmitting mobile terminal, in accordance with an embodiment of the invention. Referring to FIG. 5, in step 502 an antenna selection frame sequence may be chosen at a transmitting mobile terminal 202. In step 504, the transmitting mobile terminal 202 may determine the number of frames which are to be transmitted in the antenna selection frame sequence. In step 506, a sequence index may be initialized to a value k=0. In step 508, the transmitting mobile terminal may set field values for the first transmitted antenna selection frame in the antenna selection frame sequence. In an exemplary embodiment of the invention ASEL_Command=0, or ASEL_Command=6, indicates that the frame is the first frame in the antenna selection frame sequence and ASEL_Data=$N_{seq}$ indicates the number of frames which remain to be transmitted in the antenna selection frame sequence.

In step 510, the transmitting mobile terminal 202 may transmit the next frame in the antenna selection frame sequence. The transmitted frame represents the $(k+1)^{th}$ frame in the antenna selection frame sequence. In step 512, the transmitting mobile terminal 202 may determine whether an antenna selection failure indication frame has been received from the receiving mobile terminal 206. In instances when an antenna selection failure indication frame has not been received, in step 514, the transmitting mobile terminal 202 may determine whether the last frame in the antenna selection frame sequence has been transmitted by determining whether k=$N_{seq}$−1.

In instances when, in step 514, k≠$N_{seq}$−1, the transmitting mobile terminal 202 may prepare to transmit the next antenna selection frame in the sequence. In step 516, the transmitting mobile terminal 202 may increment the sequence index. In step 518, the transmitting mobile terminal may set ASEL_Data=$N_{seq}$−k as the value for the ASEL Data field in the next transmitted antenna selection frame. The current value $N_{seq}$−k may represent the remaining number of frames to be transmitted in the antenna selection frame sequence. The next frame may be transmitted in step 510 following step 518.

In instances when, in step 512, an antenna selection failure indication frame is received, in step 520, the transmitting mobile terminal 202 may determine whether the receiving mobile terminal is requesting a restart of the antenna selection frame sequence by evaluating the ASEL Data field in the received failure indication frame, Rec_ASEL_Data. In instances when Rec_ASEL_Data=0, the transmitting mobile terminal 202 may restart the antenna selection frame sequence at step 502. Following step 520, the antenna selection frame sequence chosen at 502 may be the same antenna selection frame sequence previously chosen or a new antenna selection frame sequence.

In instances when, in step 520, when Rec_ASEL_Data≠0, the transmitting mobile terminal 202 may attempt to resume the antenna selection frame sequence. The transmitting mobile terminal 202 may determine a starting point for the resumption by retransmitting an antenna selection frame based on the value Rec_ASEL_Data. In step 522, the transmitting mobile terminal 202 may reset the value for the sequence index to k=Rec_ASEL_Data. In instances, in which k=0, the transmitting mobile terminal may restart the antenna selection frame sequence from the beginning of the frame sequence. In step 524, the transmitting mobile terminal may set field values for the first retransmitted antenna selection frame in the antenna selection frame sequence. In an exemplary embodiment of the invention ASEL_Command=1 indicates a resumption of a previously started current antenna selection frame sequence and ASEL_Data=$N_{seq}$−k indicates the number of frames, which remain to be transmitted in the antenna selection frame sequence. The first retransmitted frame may be transmitted at step 510 following step 524.

In instances when, in step 514, k=$N_{seq}$−1, the transmitting mobile terminal 202 may determine that the last antenna selection frame in the antenna selection frame sequence has been transmitted. At step 526, the transmitting mobile terminal 202 may determine whether an antenna selection failure indication frame has been received after completion of the antenna selection frame sequence. In instances, in step 526, an antenna selection failure indication frame has been received, step 520 may follow. Otherwise, the transmitting mobile terminal 202 may await reception of feedback information from the receiving mobile terminal 206.

Figure 6:
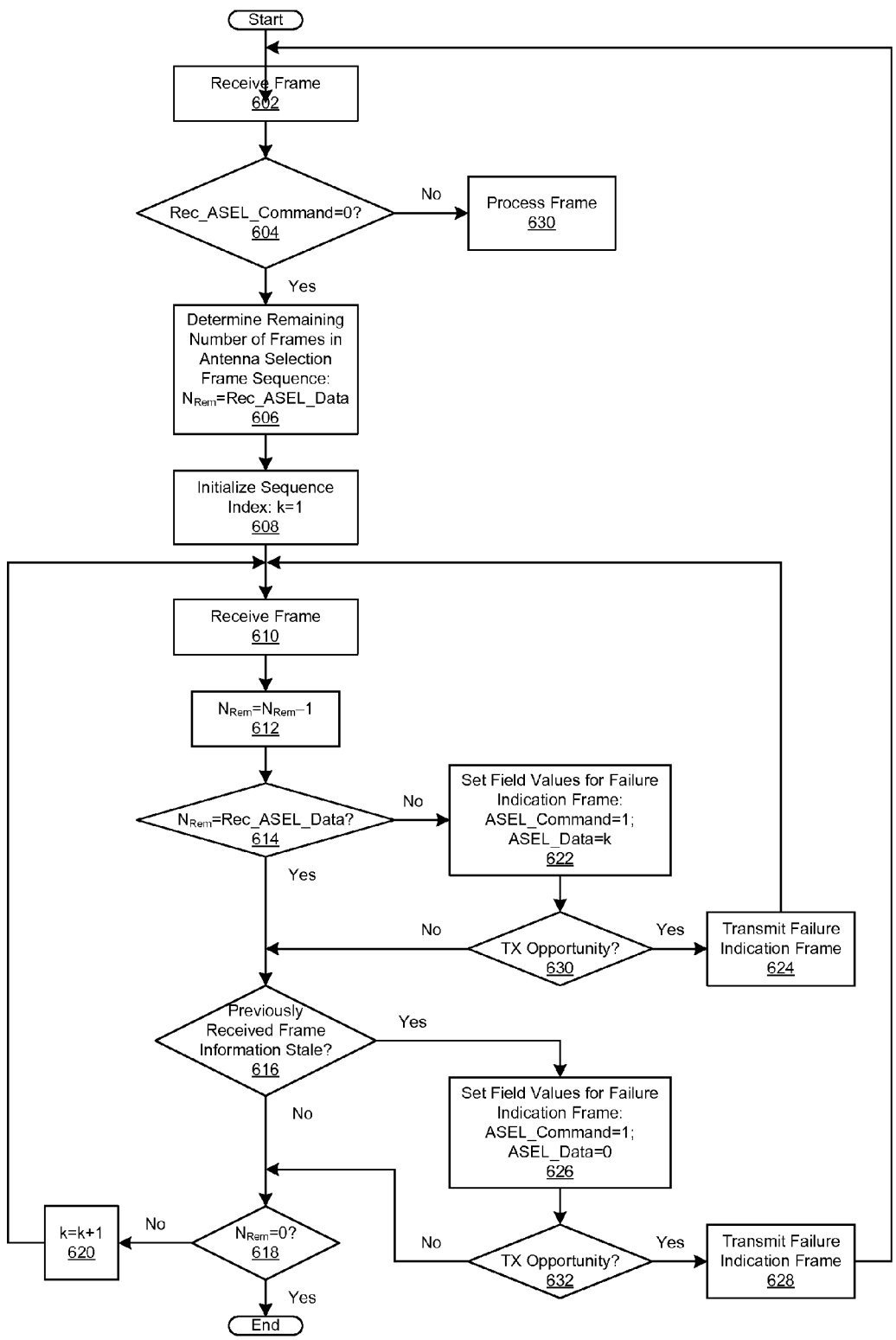
FIG. 6 is a flowchart illustrating exemplary steps for a transmitting antenna selection failure recovery mode at a receiving mobile terminal, in accordance with an embodiment of the invention.

FIG. 6 is a flowchart illustrating exemplary steps for a transmitting antenna selection failure recovery mode at a receiving mobile terminal, in accordance with an embodiment of the invention. Referring to FIG. 6, in step 602, the receiving mobile terminal 206 may receive a frame. In step 604, the receiving mobile terminal 206 may determine whether the received frame indicates the beginning of an antenna selection frame sequence by determining whether the received frame comprises an ASEL Command field. In instances when the value for the ASEL Command field, Rec_ASEL_Command=0, or Rec_ASEL_Command=6, in step 606, the receiving mobile terminal 206 may evaluate the value of the ASEL Data field in the received frame, Rec_ASEL_Data, to determine the number of frames remaining to in the antenna selection frame sequence. Otherwise, the received frame is suitably processed based on the contents in step 630. Referring to step 606, an index value for the number of remaining frames may be represented by the variable, $N_{Rem}$, for which $N_{Rem}$=Rec_ASEL_Data.

In step 608, a sequence index may be initialized to a value k=1. In step 610, the receiving mobile terminal 206 may receive the next frame in the antenna selection frame sequence. In step 612, the receiving mobile terminal 206 may decrement the remaining frame count, $N_{Rem}$. In step 614, the receiving mobile terminal 206 may compare the current value for the remaining frame count to the value in the ASEL Data field in the received antenna selection frame, Rec_ASEL_Data. In instances when $N_{Rem}$=Rec_ASEL_Data, in step 616, the receiving mobile terminal 206 may determine whether the data contained in a previously received antenna selection frame is stale. In instances when the data contained in one or more previously received antenna selection frames is determined to be not stale, in step 618, the receiving mobile terminal 206 may determine whether there are remaining frames in the antenna selection frame sequence. In instances when $N_{Rem}$=0 the receiving mobile terminal may determine that the antenna selection frame sequence has completed. The receiving mobile terminal 206 may subsequently generate antenna selection feedback information, which may be transmitted to the transmitting mobile terminal 202.

In instances when $N_{Rem}$≠0 in step 618, in step 620, the sequence index value, k, may be incremented. The receiving mobile terminal 206 may receive the next frame in the antenna selection frame sequence at step 610, following step 620.

In instances when information in one or more previously received antenna selection frames is determined to be stale in step 616, in step 626, the receiving mobile terminal 206 may set field values for an antenna selection failure indication frame. In an exemplary embodiment of the invention ASEL_Command=1 indicates that the receiving mobile terminal 206 detected a failure during the antenna selection procedure and ASEL_Data=0 indicates that a restart of the antenna selection frame sequence from the beginning is requested. In step 632, the receiving mobile terminal 206 may determine whether there is an available transmission opportunity. In instances when, in step 632, the receiving mobile terminal determines that there is an available transmission opportunity, in step 628, the receiving mobile terminal 206 may transmit the antenna selection failure indication frame. The receiving mobile terminal 206 may await the first frame in a subsequent antenna selection frame sequence at step 602 following step 628. In instances, in step 632, when the receiving mobile terminal 206 determines that there is not an available transmission opportunity, step 618 may follow step 632.

In instances when $N_{Rem}$≠Rec_ASEL_Data, in step 614, the receiving mobile terminal 206 may determine that at least one frame in the antenna selection frame sequence has not been successfully received. The receiving mobile terminal 206 may therefore determine that a failure has occurred during the antennal selection procedure. In step 622, the receiving mobile terminal 206 may set field values for an antenna selection failure indication frame. In an exemplary embodiment of the invention ASEL_Command=1 indicates that the receiving mobile terminal 206 detected a failure during the antenna selection procedure and ASEL_Data=k indicates that a resumption of the antenna selection frame sequence starting from the (k+1)$^{th}$ frame in the sequence is requested. In step 630, the receiving mobile terminal 206 may determine whether there is an available transmission opportunity. In instances when, in step 630, the receiving mobile terminal determines that there is an available transmission opportunity, in step 624, the receiving mobile terminal 206 may transmit the antenna selection failure indication frame. The receiving mobile terminal 206 may await retransmission of the (k+1)$^{th}$ frame in the current antenna selection frame sequence at step 610 following step 624. In instances, in step 630, when the receiving mobile terminal 206 determines that there is not an available transmission opportunity, step 616 may follow step 630.

Another embodiment of the invention may provide a computer readable medium having stored thereon, a computer program having at least one code section executable by a computer, thereby causing the computer to perform steps as described herein for a transmitting antenna selection failure recovery mode.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A transmitter for wireless communication comprising:
   a spatial mapping matrix to perform computations on a plurality of spatial data streams to generate a plurality of transmit data chains for radio frequency transmissions from a plurality of transmitting antennas;
   an antenna mapping circuit coupled to receive the plurality of the transmit data chains and to switch the data chains to corresponding one or more transmitting antennas; and
   wherein a sequence of sounding frames are to be transmitted from at least one of the antennas during an antenna selection procedure, in which a receiver that is operable to receive the sounding frames is to use the sounding frames in antenna selection during the antenna selection procedure, and wherein when the receiver identifies a failure of a reception of one of the sounding frames or when a prolonged delay occurs between two sequential sounding frames, the receiver to transmit back to the transmitter, a failure indication that includes a value corresponding to a frame number where the failure of reception or prolonged delay occurs in the sequence of sounding frames, to which the transmitter, upon receiving the failure indication from the receiver, retransmits sounding frames commencing from the frame number identified by the value for the sequence of sounding frames.

2. The transmitter of claim 1, further operable to decide when to retransmit sounding frames commencing from the frame number identified by the value for the sequence of sounding frames to the receiver or to retransmit all of the sequence of sounding frames to the receiver.

3. The transmitter of claim 1, wherein the transmitter transmits a number of transmit data chains that is less than a number of transmitting antennas during the antenna selection procedure.

4. The transmitter of claim 3, wherein a number of sounding frames transmitted in the sequence of sounding frames is determined as an integer number that is equal to or greater than a ratio of the number of transmitting antennas to the number of transmit data chains.

5. The transmitter of claim 3, wherein a first sounding frame of the sequence of sounding frames includes a value that indicates a total number of sounding frames in the sequence of sounding frames.

6. The transmitter of claim 5, wherein the transmitter is part of an access point in a wireless communication network.

7. The transmitter of claim 5, wherein the transmitter is part of a mobile device.

8. The transmitter of claim 5, further operable to decide when to retransmit sounding frames commencing from the frame number identified by the value for the sequence of sounding frames to the receiver or to retransmit all of the sequence of sounding frames to the receiver.

9. A receiver for wireless communication comprising:
   input circuitry coupled to a plurality of antennas to receive transmissions from a transmitter having a plurality of transmitting antennas and to provide corresponding receive data chains;
   a spatial equalizer coupled to the input circuitry to receive the receive data chains that includes a sequence of sounding frames from the transmitter when the transmitter transmits the sequence of sounding frames during an antenna selection procedure; and
   wherein the receiver to use the sounding frames in antenna selection during the antenna selection procedure, in which when the receiver identifies a failure of a reception of one of the sounding frames or when a prolonged delay occurs between two sequential sounding frames, the receiver to send back to the transmitter, a failure indication that includes a value corresponding to a frame number where the failure of reception or prolonged delay occurs in the sequence of sounding frames, in order for the transmitter to commence retransmission of the sounding frames from the frame number identified by the value for the sequence of sounding frames.

10. The receiver of claim 9, wherein the receiver to receive the transmissions from the transmitter that transmits a number of transmit data chains that is less than a number of transmitting antennas during the antenna selection procedure.

11. The receiver of claim 9, wherein a first sounding frame of the sequence of sounding frames includes a value that indicates a total number of sounding frames in the sequence of sounding frames.

12. The receiver of claim 11, wherein the receiver is part of a station that operates with an access point in a wireless communication network.

13. The receiver of claim 11, wherein the receiver is part of a mobile device.

14. The receiver of claim 11, further comprising a plurality of antennas, each coupled to a respective one of the plurality of input circuitry, wherein the plurality of antennas provide for multiple input, multiple output operations with the transmitter.

15. A method for antenna selection comprising:
   performing computations on a plurality of spatial data streams in a spatial mapping matrix of a transmitter to generate a plurality of transmit data chains for radio frequency transmissions from a plurality of transmitting antennas;
   switching transmit data chains in an antenna mapping circuit to route the transmit data chains to corresponding one or more transmitting antennas;
   transmitting from a transmitter a sequence of sounding frames from at least one of the antennas during an antenna selection procedure, in which a receiver that is operable to receive the sounding frames is to use the sounding frames in antenna selection during the antenna selection procedure, and wherein when the receiver identifies a failure of a reception of one of the sounding frames or when a prolonged delay occurs between two sequential sounding frames, the receiver to transmit back to the transmitter, a failure indication that includes a value corresponding to a frame number where the failure of reception or prolonged delay occurs in the sequence of sounding frames; and retransmitting sounding frames from the transmitter commencing from the frame number identified by the value for the sequence of sounding frames from the transmitter, upon receiving the failure indication from the receiver.

16. The method of claim 15, wherein when transmitting the sequence of sounding frames, a first sounding frame of the sequence of sounding frames includes a value that indicates a total number of sounding frames in the sequence of sounding frames.

17. The method of claim 16, wherein the radio frequency transmissions are compatible with 802.11 protocol.

18. The method of claim 16, further including receiving the radio frequency transmissions at a plurality of antennas coupled to an input circuitry of the receiver that provides a plurality of corresponding receive data chains and equalizing the receive data chains that include the sounding frames during the antenna selection procedure.

19. The method of claim 18, wherein the receiver is a mobile device.

20. The method of claim 18, wherein the transmitter operates as an access point and the receiver operates as a station to the access point.

* * * * *